United States Patent
Combs (10) Patent No.: US 6,575,479 B2
(45) Date of Patent: Jun. 10, 2003

(54) THREE RUNNER SLED (75) Inventor: Andrew S. Combs, Morristown, TN (US)

(73) Assignee: Triage Sled Works, Inc., Morristown, TN (US)

( * ) Notice: Subject to any disclaimer, the term of this patent is extended or adjusted under 35 U.S.C. 154(b) by 0 days.

(21) Appl. No.: 10/190,540

(22) Filed: Jul. 9, 2002

(65) Prior Publication Data
US 2003/0006569 A1 Jan. 9, 2003

Related U.S. Application Data
(60) Provisional application No. 60/303,407, filed on Jul. 9, 2001.

(51) Int. Cl.$^7$ .......................... B62B 13/00; B62B 13/14
(52) U.S. Cl. .......................... 280/21.1; 280/15; 280/16; 280/28.11; 280/22.1; 280/25; 280/27
(58) Field of Search .................. 280/15, 16, 28.11, 280/22.1, 21.1, 27, 25, 276; 267/220; 188/322.16

(56) References Cited

U.S. PATENT DOCUMENTS

| 3,398,970 | A | * | 8/1968 | Horiuchi ...................... 280/16 |
| 3,682,495 | A | | 8/1972 | Zaimi |
| 3,689,092 | A | * | 9/1972 | Lake .......................... 280/606 |
| 3,746,357 | A | * | 7/1973 | Haskins ........................ 280/15 |
| 3,799,565 | A | * | 3/1974 | Burtis et al. ................ 180/182 |
| 3,833,234 | A | | 9/1974 | Schreiber |
| 3,858,896 | A | | 1/1975 | Evequoz |
| 3,900,208 | A | | 8/1975 | Hjelmquist |
| 4,063,746 | A | | 12/1977 | Hansen |
| 4,101,142 | A | | 7/1978 | Turner |
| 4,141,566 | A | | 2/1979 | Benes et al. |
| D252,505 | S | | 7/1979 | Derkach et al. |
| 4,256,319 | A | * | 3/1981 | Winter .......................... 188/8 |
| 4,324,409 | A | * | 4/1982 | Larsen et al. .............. 280/14.1 |
| 4,342,372 | A | * | 8/1982 | Hayes ........................ 180/182 |
| 4,676,521 | A | * | 6/1987 | Monreal ..................... 280/606 |
| 5,335,925 | A | | 8/1994 | Dolson |
| 5,518,080 | A | | 5/1996 | Pertile |
| 5,580,071 | A | * | 12/1996 | Yu ............................... 280/16 |
| 5,673,772 | A | * | 10/1997 | Martin .......................... 188/6 |

FOREIGN PATENT DOCUMENTS

CA          1037529          8/1978

* cited by examiner

Primary Examiner—Brian L. Johnson
Assistant Examiner—Brian L Swenson
(74) Attorney, Agent, or Firm—Richard C. Litman (57) ABSTRACT A three runner sled includes a single steerable front runner and two directionally fixed rear runners extending from a frame. The frame has a longitudinal backbone member with an elongate seat. Each rear runner has a knee rest somewhat forwardly positioned relative to the seat. Each rear runner also has a foot rest at its rearward end. This configuration results in a kneeling position for the sled operator, providing a relatively low center of gravity for the sled and operator, yet allowing the operator to readily shift his/her weight laterally for better balance and control. The telescoping steering column connecting the front runner to the sled frame includes an adjustable suspension. Independently actuated brakes are provided at the rearward ends of the rear runners, controlled by separate brake levers. Attachments may be provided for carrying the sled on a person's back, for convenient sled transport.

16 Claims, 9 Drawing Sheets

THREE RUNNER SLED

REFERENCE TO RELATED PATENT APPLICATION

This application claims the benefit of U. S. Provisional Patent Application Ser. No. 60/303,407, filed on Jul. 9, 2001.

BACKGROUND OF THE INVENTION

1. Field of the Invention

The present invention relates generally to sleds, sleighs, and related devices for travel over ice and snow, and more particularly to a small single occupant sled having two fixed rearward runners and a single steerable front runner. The present three runner sled incorporates various improvements over sleds of the prior art, including an adjustable front suspension, novel brake means, and means for carrying the device on the back of a person on foot.

2. Description of Related Art

Sleds and related vehicles have been developed in many cultures throughout the world, wherever climatological conditions provide for ice and snow. Generally speaking, sleds have not evolved appreciably over the years, and can be divided into a relatively few classes based upon their runner configurations. The present invention relates more particularly to sleds having multiple runners with at least one steerable runner, as opposed to toboggans, dual fixed runner sleds, and the like.

Most sleds known in the past are relatively simple devices, having no suspension and relatively crude (if any) steering. Such devices are generally intended purely for recreation, and are generally operated by one or more occupants (generally children) in relatively short runs down a reasonably gentle slope. In such conditions, such relatively primitive sled configurations are reasonably safe. However, the poor suspension, steering, and brakes (if any) provided with such sleds, can easily prove to be a hazard if an occupant or user attempts a slope which leads to somewhat more speed than he or she is used to, or more speed than the relatively primitive sled configuration is equipped to handle.

Accordingly, a need will be seen for a single occupant three runner sled which incorporates various features which provide additional safety margins for persons using the present sled. The present three runner sled incorporates a front suspension which may be adjusted as desired for the weight and seating position of the occupant, as well as the ambient snow or ice conditions (rough, smooth, etc.). Independent brakes are also provided behind each of the rear runners, with the brake shoes being interchangeable as desired for different conditions. A "dead man's," or emergency, brake is also automatically actuated in the event the occupant falls from the sled. The kneeling position provided for the occupant of the present sled is somewhat like that used with personal watercraft, and provides a relatively low center of gravity while still allowing the occupant to shift his or her weight readily for better control.

A discussion of the related art of which the present inventors are aware, and the differences and distinctions between that art and the present invention, is provided below.

U.S. Pat. No. 3,682,495 issued on Aug. 8, 1972 to Kourosh Zaimi, titled "Snow Bike," describes a three runner device somewhat resembling the classic two runner ski-bob, in that a bicycle type seat is provided on the longitudinal member extending forwardly from the single non-steerable rear runner. However, the Zaimi device includes two steerable front runners, with the directions of the front runners being independently controllable relative to one another. Each front runner has an independent brake, with each separately steerable handlebar having a brake lever thereon for the brake on that side. The seating position does not provide the versatility of the present sled's seating position, and the two independently steerable front runners and single rear runner are essentially reversed from the configuration of the present sled.

U.S. Pat. No. 3,833,234 issued on Sep. 3, 1974 to Hermann Schreiber, titled "Vehicle, In Particular For Training In The Coordination Of Several Controls," describes a three runner sled having a single steerable front runner and two fixed rearward runners. No specific seating arrangement is disclosed, but it is apparent that the operator's feet must be deployed forwardly, as the directional steering is configured to simulate the forwardly disposed rudder pedals of a conventionally controlled aircraft. Other controls cause the Schreiber sled to bank by tilting the sled relative to the two rearward runners, unlike the present sled.

U.S. Pat. No. 3,858,896 issued on Jan. 7, 1975 to Jean-Yves Evequoz, titled "Ski-Bob," describes a three runner sled having a single steerable front runner and two closely spaced rear runners. While the conventional ski-bob is equipped with only two runners in tandem, the Evequoz sled is closely related, as the two rear runners have only enough clearance therebetween to provide for independent operation of their separate suspensions. They are so closely spaced that no real lateral stability is provided, with the operator being required to balance laterally using his or her feet. In any event, no adjustability is disclosed for the front suspension, as provided by the present sled, and the seating arrangement of the Evequoz sled is completely different, due to the need to position the operator's feet laterally from the sled for stability.

U.S. Pat. No. 3,900,208 issued on Aug. 19, 1975 to Stig Gunnar Hjelmquist, titled "Sleds," describes a three runner sled having a single steerable front runner and two directionally fixed rear runners. However, the Hjelmquist sled has no suspension whatsoever and a single hand operated brake affixed to the front runner, rather than the two rearwardly disposed and independently controllable brakes of the present sled. Moreover, the seating position is unlike that of the present sled, with the Hjelmquist sled having a generally rearwardly disposed seat and lateral runners extending forwardly of the seat for placement of the operator's feet. Hjelmquist also uses a steering wheel, rather than handle bars, for directional control of his sled.

U.S. Pat. No. 4,063,746 issued on Dec. 20, 1977 to Odd Hansen, titled "Sledge," describes a three runner sled having a single steerable front runner and two directionally fixed rear runners. The two rear runners are linked together at their forward ends by a crossmember which passes in front of the steering column of the device; no suspension means is disclosed for the front runner or ski. The seating position is completely different than that provided by the present sled, with the operator's feet positioned forwardly of the seat in order to operate the forwardly disposed brake spurs which extend through the forward portions of the two laterally spaced rear runners, more or less laterally in line with the steering wheel.

U.S. Pat. No. 4,101,142 issued on Jul. 18, 1978 to Richard W. Turner, titled "Snow Sled Turning Mechanism," describes a three runner sled having a single steerable front runner steered by handlebars. The Turner sled includes a relatively wide body portion for the occupant(s) and braking means extending from each of the non-steerable rear runners, with the brakes being independently selectively actuated by corresponding levers on the handlebars. No specific seating position is shown or described by Turner, but it is apparent that the rider's feet are not positioned rearwardly, as Turner does not provide any rearwardly disposed foot rests in his sled. Moreover, while Turner provides a suspension spring for the front runner, he makes no disclosure of any means of adjusting the front suspension in any way, whereas the present sled includes front suspension adjustment means.

U.S. Pat. No. 4,141,566 issued on Feb. 27, 1979 to David M Benes et al., titled "Wheelchair Supporting Sled," describes a sled having a single steerable front runner with four laterally spaced rearward runners, the two outermost runners being provided for increased lateral stability. Steering and braking are controlled respectively by a handlebar and brake handgrips on the handlebar. No seating position is provided in the Benes et al. sled. Rather, a series of clamps is provided to secure a wheelchair frame removably to the sled structure, with the wheelchair providing the required seating for the operator. No rearwardly disposed footrests are provided (other than for an optional second occupant, who has no seating, standing upon the rearward ends of two of the main runners), as a person confined to a wheelchair would obviously not be able to rest his/her feet in such rests.

U.S. Pat. No. 5,335,925 issued on Aug. 9, 1994 to Murray Dolson, titled "Snow Sled," describes a three runner sled having a single steerable front runner and two directionally fixed rear runners. The front runner may include suspension means. The frame and seating are adjustably secured to the main runners, which are connected by flexible members which pass through inverted U-shaped tubes beneath the seat. Thus, the operator may rock the seat laterally to maintain a level seating position when traversing a slope laterally. No braking means is disclosed by Dolson, and the footrest position is relatively far forward, adjacent the forward portion of the seat, rather than being rearwardly disposed as in the present sled invention.

U.S. Pat. No. 5,518,080 issued on May 21, 1996 to Liano Pertile, titled "Snow Vehicle," describes a three runner sled with a pair of front runners and a single rear runner. The Pertile sled may be powered or unpowered. A relatively complex mechanism steers the front runners, with other means provided for tilting or banking the sled relative to the front runners. The frame is articulated between the front runners and single rear runner, with the seat having a spring suspension relative to the frame. No specific suspension is provided for the front runners, however. The only footrest areas provided appear to be on the rearward portions of the front runners, due to the narrow single rear runner.

U.S. Pat. No. D-252,505 issued on Jul. 31, 1979 to Gennady G. Derkach et al., titled "Snow Sled," illustrates a design for a three runner sled having a configuration much like that of the Hjelmquist '208 U.S. Utility Patent discussed further above. No braking means is apparent in the Derkach et al. design, and the design uses handlebars rather than the steering wheel of Hjelmquist, but otherwise the points raised in the discussion of the sled of the Hjelmquist '208 U.S. Utility Patent, are seen to apply here as well.

Finally, Canadian Patent Publication No. 1,037,529 issued on Aug. 29, 1978 to Odd Hansen, titled "Sledge," is based upon the same Norwegian parent application as the '746 U.S. patent to the same inventor, discussed further above. Accordingly, the same points of distinction between the sled of the '746 U.S. patent and the present invention noted above, are seen to apply here as well.

None of the above inventions and patents, either singly or in combination, is seen to describe the instant invention as claimed.

SUMMARY OF THE INVENTION

The present invention comprises a relatively small and light weight sled having a single steerable front runner and a pair of laterally disposed, directionally fixed rear runners. The present sled is adapted for use by a single rider or operator, in the manner of "ski-bob" type personal ski devices or sleds. However, the operator or rider position is more akin to that used with many smaller personal watercraft (e. g., Jet-Ski®), rather than conventional sleds of the prior art.

The present three runner sled includes an adjustable front suspension for the steerable front runner, and a rearwardly disposed footrest atop each of the rearwardly disposed directionally fixed runners. A relatively narrow and elongate seat is provided along the raised central framework, from which the fixed runners depend to each side. Brakes are provided to the rear of the footrests, with the brakes being selectively actuated by independently controllable hand grips on the steering handlebars. The brake shoes or "paws" may be interchanged as desired for different conditions (snow, ice, etc.), and an automatic "dead man's" brake is also provided to stop the sled in the event the rider falls from the sled. The present sled further includes means for carrying the device on the back of a person on foot, if desired.

Accordingly, it is a principal object of the invention to provide a three runner sled having a single steerable front runner and two laterally spaced, directionally fixed rear runners, providing various safety and convenience features over conventional sleds of the related art.

It is another object of the invention to provide a three runner sled including adjustable front suspension means and selectively controllable independent braking means disposed rearwardly from each of the rearward runners, and an emergency brake activated by inadvertent operator dismount from the sled.

It is a further object of the invention to provide a three runner sled including a relatively narrow central seat with rearwardly disposed footrests for the operator, positioning the operator optimally for leaning laterally for better control of the sled.

Still another object of the invention is to provide a three runner sled including means for carrying the device conveniently upon the back of a person on foot, for transporting the sled to and from an area of use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
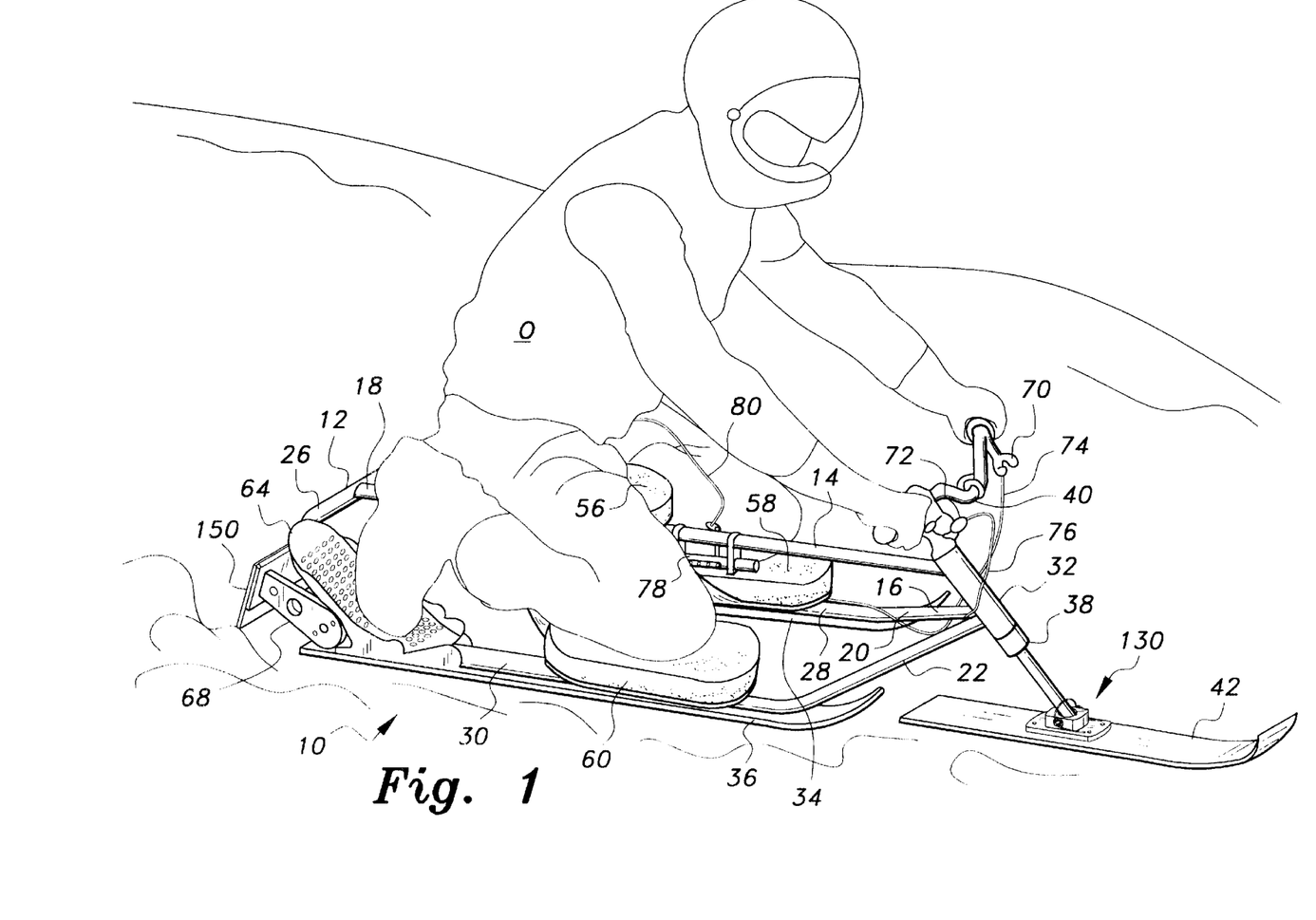
FIG. 1 is an environmental, perspective view of a three runner sled according to the present invention, showing its general configuration, operation, and operator position.

The present invention comprises a three runner sled incorporating various safety and convenience features not previously provided in similar single rider sleds and the like. FIG. 1 of the drawings provides an environmental perspective view of the present sled 10, showing its general configuration and use, with FIG. 2 providing an exploded perspective view of the major components of the present sled.

The various components of the sled 10 are assembled to a peripheral frame structure 12, preferably formed of lightweight welded metal tubing (aluminum, etc.). The frame 12 includes a raised longitudinal backbone member 14 having a forward end 16 and an opposite rearward end 18, with generally laterally depending forward left and right braces, respectively 20 and 22, and rearward left and right braces, respectively 24 and 26. Corresponding left and right longitudinal members, respectively 28 and 30, extend between their respective left side braces 20 and 24 and right side braces 22 and 26. The frame periphery comprising the brace series 20 through 26 and left and right longitudinal members 28 and 30, may be formed as a continually bent length of tubing if so desired, rather than welding or otherwise assembling a series of shorter tubing lengths. The forward end of the frame 10 assembly, i.e., the junction of the forward end 16 of the backbone member 14 and the upper ends of the left and right forward frame members 20 and 22, are affixed to a forwardly and downwardly inclined steering column passage 32, for accepting a steering column therethrough.

Left and right runners or skis 34 and 36 are attached to the respective left and right side longitudinal frame members 28 and 30, and provide primary support for the sled 10 on snow or other soft and/or low friction surfaces. These two rearwardly disposed runners 34 and 36 are directionally fixed to their respective longitudinal frame members 28 and 30, and do not turn relative to the sled frame 12.

Figure 2:
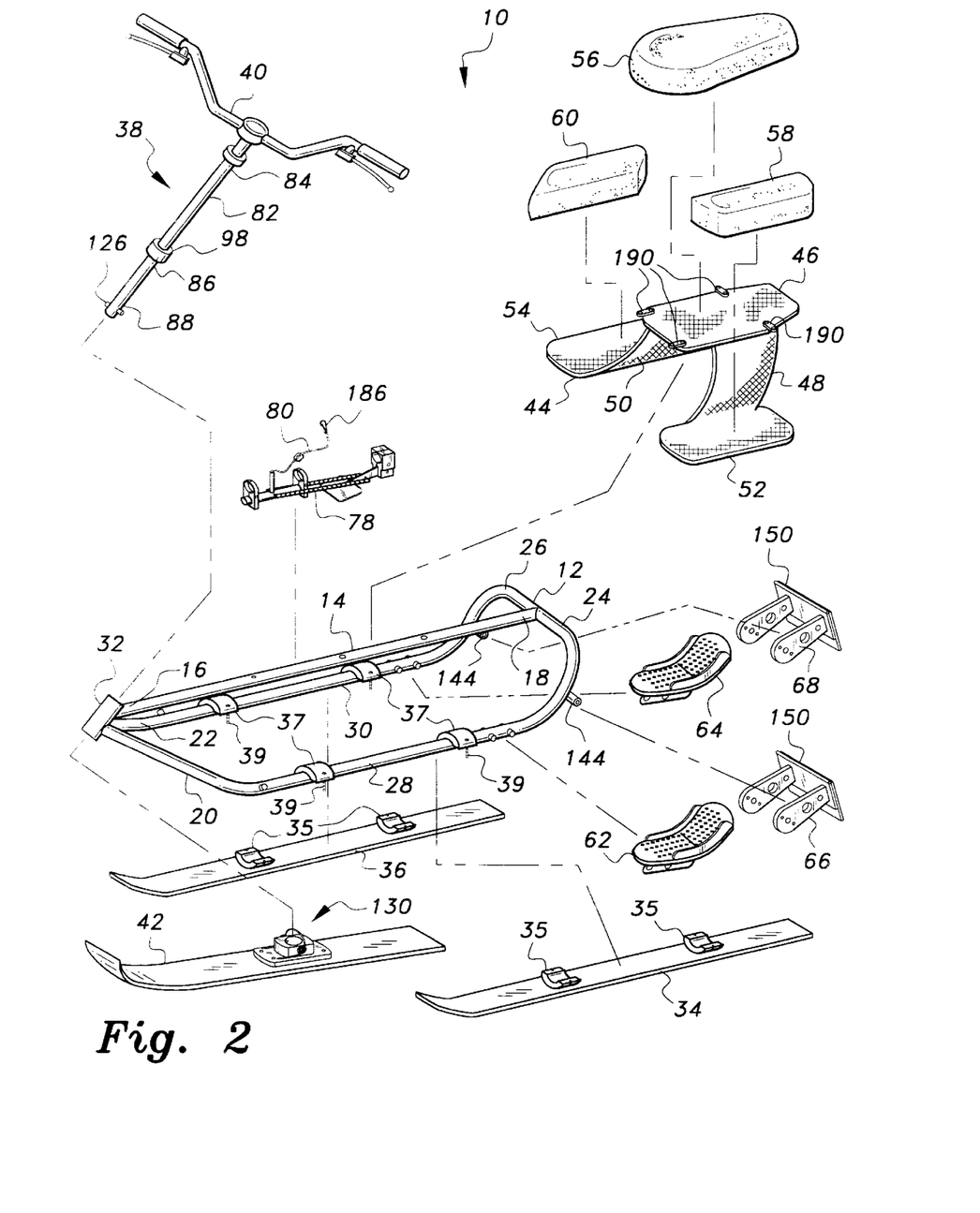
FIG. 2 is an exploded perspective view of the present three runner sled, illustrating its major components and their relationships.

However, the runner attachment means allows the camber of the two runners or skis 34 and 36 to be adjusted as desired. Each runner or ski 34 and 36 includes forwardly and rearwardly disposed, generally semicircular split collar halves 35 immovably affixed thereto, with mating semicircular split collar halves 37 fitting over the top of each longitudinal member 28 and 30. The corresponding collar halves 35 and 37 are secured together around the respective longitudinal members 28 and 30 by conventional bolts 39, as shown in FIG. 2 of the drawings.

This attachment configuration allows the camber or lateral angle of the two runners or skis 34 and 36 to be adjusted by loosening the bolts 39, rotating the skis 34 and 36 about their respective longitudinal frame members 28 and 30, and tightening the bolts 39 to secure the skis 34 and 36 at the lateral angle or camber desired. This permits the operator O of the present sled 10 to adjust the camber of the two runners or skis 34 and 36, in order to achieve the desired lateral grip and to reduce lateral sliding or skidding during sled operation.

Figure 3:
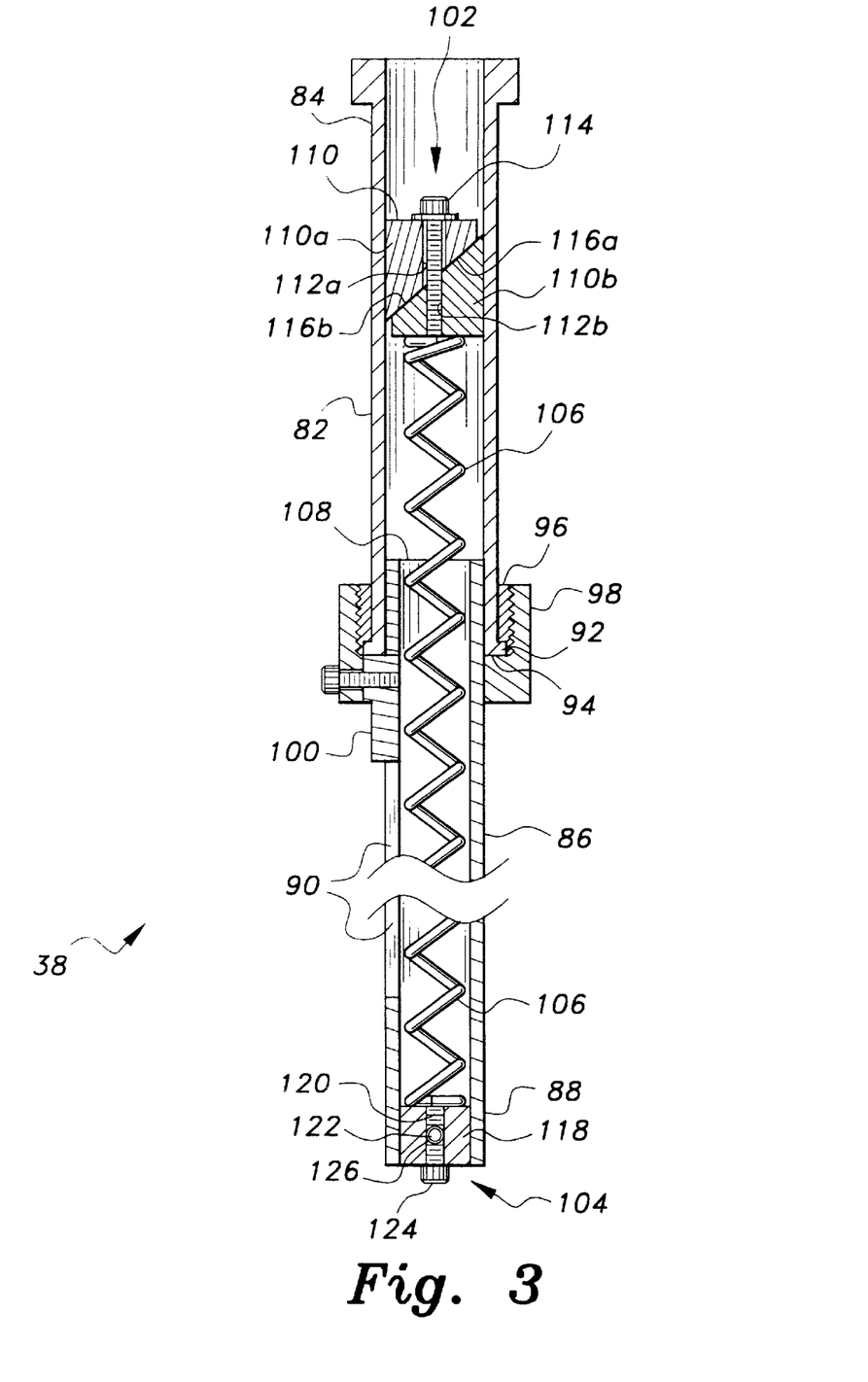
FIG. 3 is a side elevation view in section of the front steering and suspension column of the present sled, showing further details thereof.
Figure 4:
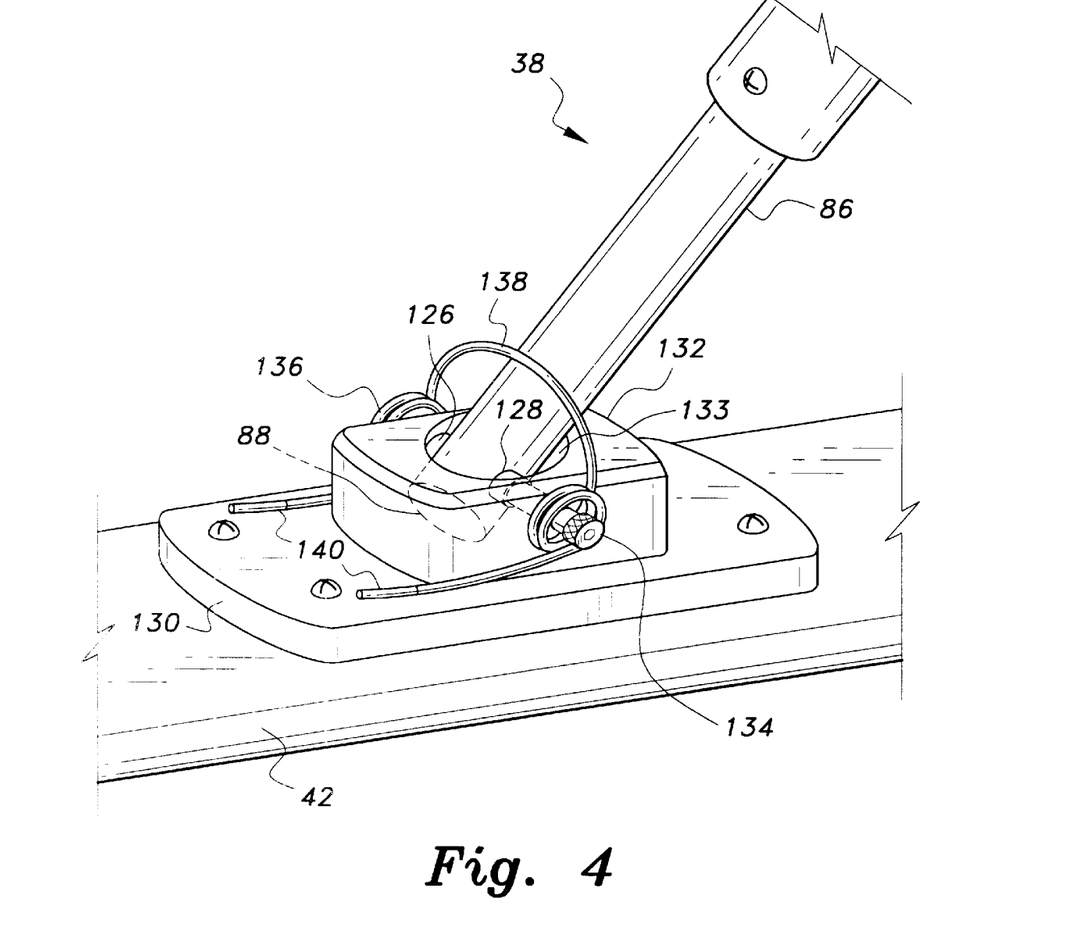
FIG. 4 is a detail perspective view of the pivotal attachment of the front runner or ski to the front steering and suspension column.

A steering column 38 is pivotally installed through the tubular steering column passage 32 at the forward end of the frame 12, with a steering mechanism 40 (handlebars, etc.) extending from the upper end of the column 38 and a steering runner or ski 42 extending from the lower end of the column 38. The column 38 and its attached runner 42 provide adjustable suspension means and articulation for the runner 42 relative to the column 38, which structure is illustrated in FIGS. 3 and 4 and discussed in detail further below.

A saddle 44 is installed atop the frame 12, straddling the backbone tube 14 and extending downwardly and to each side to attach atop the respective lower longitudinal frame members 28 and 30. The saddle 44 includes a flat upper plate 46 with left and right side walls 48 and 50 depending therefrom, with the two walls 48 and 50 having laterally extending side plates 52 and 54 which attach to the upper sides of the respective lower longitudinal frame members 28 and 30, generally opposite the two runners 34 and 36. The saddle 44 provides additional stiffening for the frame 12 structure, and is preferably formed of carbon fiber composite material. Other materials (aluminum sheet, etc.) may be used.

The saddle structure 44 provides a platform for a seat and other cushioning for an operator O using the present sled 10. It will be seen from the drawings (particularly FIG. 2) that the two side walls 48 and 50 of the saddle 44 sweep upwardly and rearwardly from their junctures with the respective lateral plates 52 and 54, with the central upper plate 46 being disposed somewhat rearwardly on the frame structure 12 when the saddle 44 is installed thereon. An elongate seat cushion 56 is secured to the upper plate 46 of the saddle 44, atop the frame backbone member 14, with the seat 56 being positioned rearwardly on the frame 12 in accordance with the rearward displacement of the upper plate 46 of the saddle 44. Left and right knee rests or pads 58 and 60 are secured to the respective left and right side lateral plates 52 and 54 of the saddle 44, somewhat forwardly of the seat cushion 56.

The seat cushion 56 and knee rests 58 and 60 may be formed of a closed cell foam material for optimum comfort, or alternatively may be formed of any other suitable material or combination thereof desired. Conventional upholstery covering (not shown) may be provided to protect the cushioning material from the elements. The saddle 44 not only serves to strengthen the frame structure 12 by tying the longitudinal frame elements 14, 28, and 30 together, but also serves to provide horizontal mounting surfaces for the seat and knee cushions 56 through 60, although these cushions 56 through 60 are essentially attached atop their respective frame members 14, 28, and 30. The result is a kneeling or crouching position for the operator O of the sled 10, essentially as depicted in FIG. 1.

A left and a right foot rest or brace, respectively 62 and 64, are secured to the rear of the frame 12 at the respective junctures of the left rear frame brace 24 and left side longitudinal member 28, and right rear frame brace 26 and right side longitudinal member 30, behind the respective left and right knee rests 58 and 60. These two foot rests 62 and 64 provide secure footing for the operator O of the sled 10 for the kneeling or crouching operator position provided by the low seat cushion 56 and knee rests 58 and 60. The result is a relatively low center of gravity for the operator O and sled 10, thereby increasing stability over many sleds and the like of the prior art.

The sled 10 also includes manually actuated, independent left and right brakes, shown generally in FIGS. 1 and 2. A left and a right brake arm assembly, respectively 66 and 68, are pivotally secured respectively to the left and right rear frame braces 24 and 26 between their junctures with the central backbone frame member 14 and the left and right lower longitudinal members 28 and 30, behind the respective left and right foot rests 62 and 64. These two brake arms 66 and 68 pivot downwardly to engage the underlying surface when actuated by respective left and right brake levers 70 and 72 installed upon the handlebars 40. A left and a right brake actuator cable 74 and 76 (shown in FIG. 1), e.g. bicycle brake cable, etc., extends between the respective actuator levers 70 and 72 and brake arms 66 and 68. Details of the brake system are shown in detail in FIGS. 5 and 6 of the drawings and described in detail further below in the discussion of those drawing Figs.

The present sled 10 also includes an emergency or "dead man's" brake 78 which is automatically actuated in the event the operator O falls from the sled 10. The emergency brake system 78 is actuated by a cable 80 which is secured to the operator O in some manner (e.g., clipped or pinned to his or her jacket, etc.). Pulling the emergency brake actuation cable 80, actuates the emergency brake system 78, which causes the emergency brake shoe to dig into the underlying surface to stop the sled. The emergency brake system 78 is illustrated in detail in FIGS. 7A and 7B of the drawings, and described in detail further below in the discussion of those Figs.

FIG. 3 illustrates the selectively adjustable front suspension system of the sled 10. The front suspension strut and steering column assembly 38 comprises an upper tube 82, with the steering control 40 extending from the upper end 84 thereof, as shown in FIG. 2. A lower tube 86 telescopes into the upper tube 82, with the front runner 42 pivotally secured to the lower end 88 of the lower tube 86, as shown in FIGS. 1 and 4 and discussed further below. The lower tube 86 has an elongate guide and extension stop slot 90 formed therein. The two tubes are telescopingly secured together by a flange 92 at the open lower end 94 of the upper tube 82, which captures an externally threaded collar 96 immediately thereabove. The collar 96 mates with an internally threaded collar 98, which holds a key 100 which rides in the slot 90. The lower tube 86 turns in registry with the upper tube 82, and is restricted in its extension, due to the key 100 locked to the lower end 94 of the upper tube 82 engaging in the slot 90 of the lower tube 86.

An adjustably positionable upper spring stop assembly 102 is installed in the upper end portion 84 of the upper tube 82, with a positionally fixed lower spring stop assembly 104 installed in the lower end 88 of the lower tube 86. A coil compression spring 106 is captured between the upper spring stop 102 and the lower spring stop 104, and extends through the open upper end 108 of the lower tube 86 and open lower end 94 of the upper tube 82 to provide resilient extension of the lower tube 86 relative to the upper tube 84, which is vertically fixed (but is free to rotate) relative to the steering column passage or-collar 32 of the frame 12.

The adjustably positionable upper spring stop assembly 102 may be quickly and easily adjusted axially in the upper tube 82, to provide greater or lesser compressive force as desired on the front suspension compression spring 106. The upper stop assembly 102 comprises a cylinder 110 having a diameter slightly smaller than the internal diameter of the upper tube 82. The stop cylinder 110 is cut diagonally thereacross, to form an upper portion 110a and a lower portion 110b. A relatively large diameter unthreaded passage 112a is formed concentrically through the upper portion 110a, with a threaded passage 112b formed concentrically through the lower portion 110b. A lock bolt 114 is inserted through the unthreaded upper passage 112a and engages the threaded lower passage 112b. When the bolt 114 is tightened, the two stop cylinder portions 110a and 110b are shifted radially due to the lateral shift of their respective sloped, truncated upper and lower contact faces 116a and 116b, to wedge tightly and immovably within the upper tube 82.

The opposite lower spring stop assembly 104 is immovably affixed within the lower end 88 of the lower tube 86. The lower stop assembly 104 comprises a cylindrical plug 118, which is cross drilled or otherwise provided with a concentric axial passage 120 and a diametric passage 122. At least the lower end of the axial passage 120, i.e., the portion below the diametric passage 122, is threaded to accept a lock bolt 124 therein. The lock bolt 124 serves to secure a transverse front runner axle bushing 126 within the diametric passage 122 of the lower stop assembly 104, with the transverse axle bushing 126 also serving to secure the lower stop assembly 104 within the lower end 88 of the lower tube 86 by means of a diametric lower passage 128 (shown in FIG. 4) formed through the lower end 88 of the lower tube 86.

While only a coil spring front runner suspension system is illustrated, it will be seen that alternative suspension means may be provided if so desired. For example, a conventional telescoping pneumatic strut may be installed through the steering column passage 32, if desired, to accommodate front suspension movement.

FIG. 4 illustrates the front runner 42 attachment to the lower end 88 of the lower front suspension and steering tube 86. A runner attachment bracket 130 having an upper steering tube attachment block 132 is secured to the forward runner 42. The front axle bushing 126 installs across a central receptacle 133 in the attachment block 132, with a pivot bolt and nut assembly 134 installed through the front axle bushing 126. A front runner spring 136 is coiled around the front axle bushing 126, with a crossmember 138 bearing against the front of the lower end 88 of the lower steering tube 86 and a pair of finger extensions 140 bearing against the forward portion of the attachment bracket 130. The spring 136 urges the runner 42 forward end downwardly, to provide positive tracking of the runner 42 forward end.

Figure 5:
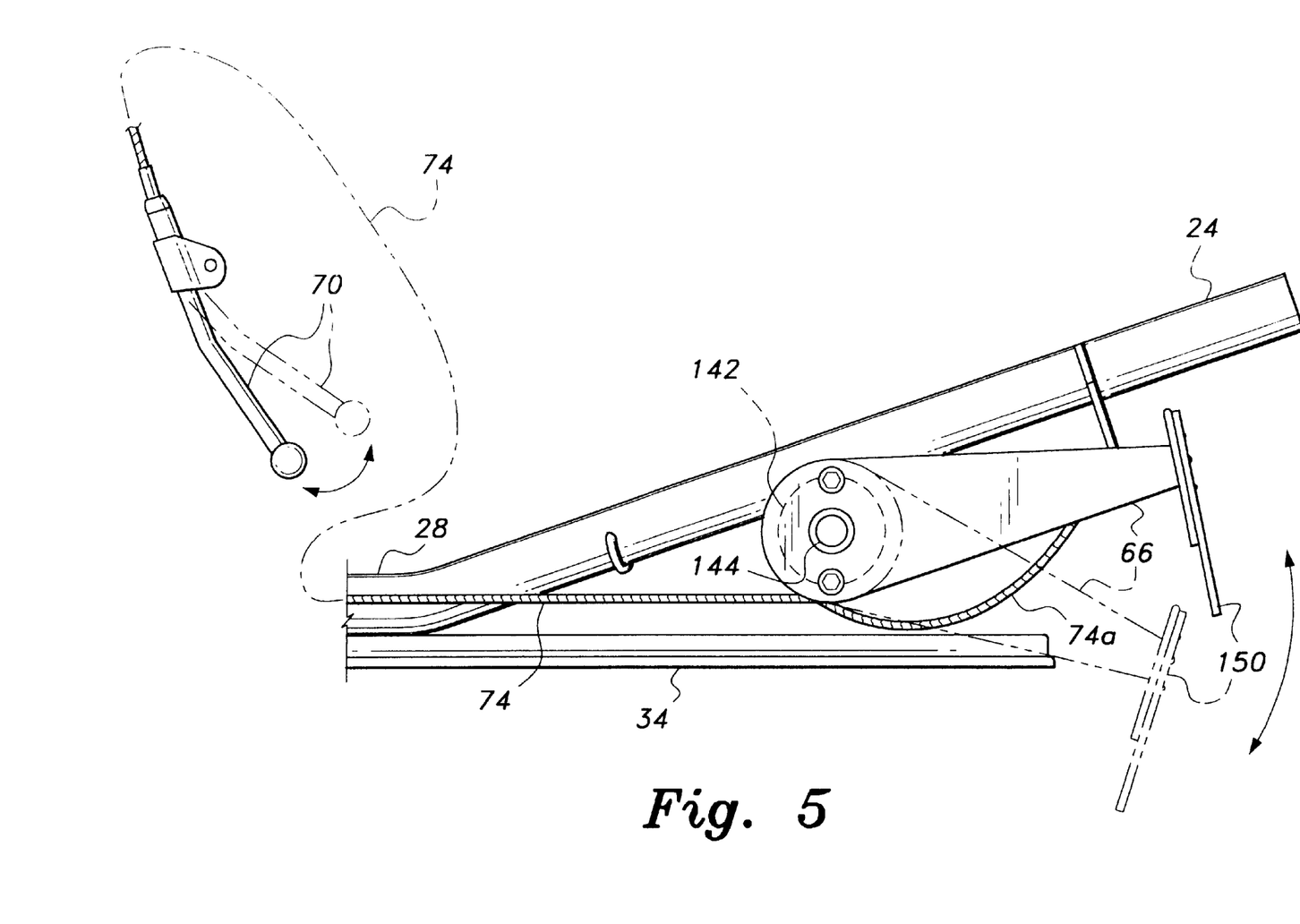
FIG. 5 is a side elevation view of one of the selectively operated brakes of the present sled, showing its operating means and retracted and extended positions.
Figure 6:
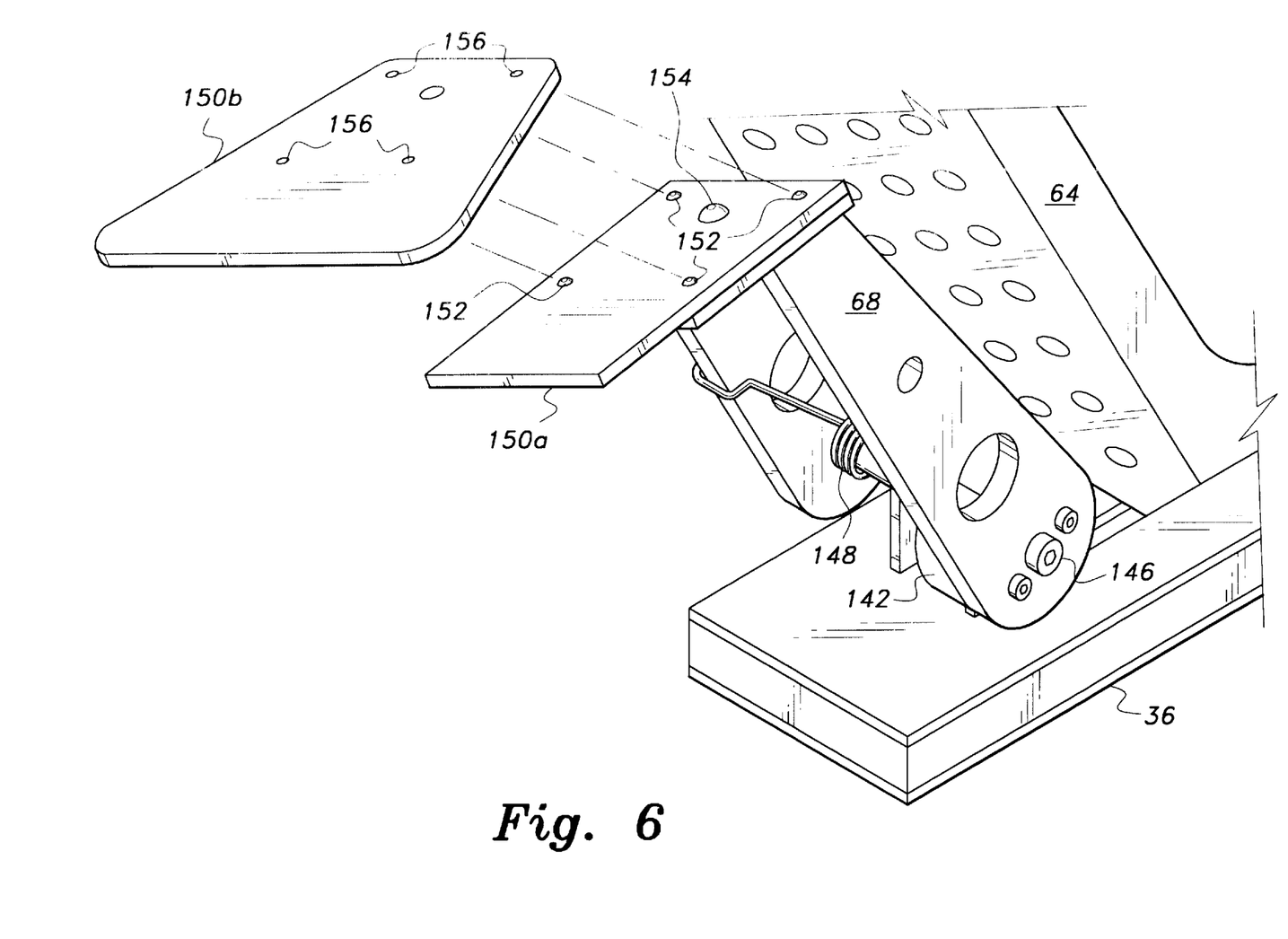
FIG. 6 is a perspective view of one of the brakes, showing the interchangeability of brake shoes or paws therewith.

FIGS. 5 and 6 respectively provide a left side elevation view and a right rear perspective view of the left and right brake assemblies of the present sled 10. FIG. 5 illustrates the actuation of the left brake arm 66 by the actuating lever 70, with it being understood that the right brake arm 68 actuation using the right actuating lever 72 is identical. Each brake arm 66 and 68 includes an axial spool 142, which is in turn pivotally secured to a brake attachment sleeve 144 extending laterally from each side of the frame 12 above the rearward ends of the two runners or skis 34 and 36. A bolt 146 (FIG. 6) or other suitable fastener may be used to secure the brake arms 66 and 68 to their respective attachment sleeves 144 on the frame 12. A brake retraction spring 148, similar to the front runner control spring 136 illustrated in FIG. 4 of the drawings, holds each brake arm 66 and 68 in a retracted position until activated by its respective hand lever 70 and/or 72.

The brakes are actuated by selectively gripping one or both brake hand levers 70 and/or 72, which in turn pulls on their respective actuating cables 74 and/or 76. The cables (e. g., the left side cable 74, shown in FIG. 5) are wrapped around and secured to their respective brake arm spools 142, with a free end (e.g., free cable end 74*a*, shown in FIG. 5) extending therefrom for cable tension adjustment as required. Pulling the selected cable causes the spool 142, and its attached arm 66 and/or 68, to rotate toward the rear of the frame 12, thereby lowering the rear of the brake arm(s) 66 and/or 68 and the attached brake shoe(s) below the level of the main runners 34 and 36 to engage the underlying surface.

The brakes of the present sled 10 include means for providing optimum braking in various conditions (e. g., powder snow, ice, etc.) as desired, by interchanging different brake shoes or "paws" 150 (shown in FIGS. 1, 2, and 5) extending from the left and right brake arms 66 and 68. FIG. 6 clearly shows the exchange of a first brake shoe or "paw" 150*a*, with a second "paw" 150*b* having a different configuration. A series of locator pins 152 extends from the underside or rear of the brake arm 68, with a single central brake paw attachment bolt 154 serving to secure the selected brake paw 150*a*, 150*b*, etc. in place. The operator need only remove the single attachment bolt 154 from the respective brake arms 66 and 68, remove the installed brake paw, and replace the removed paw with a different selected paw by aligning the locator holes 156 of the selected replacement paw with the locator pins 152, and tightening the single brake paw attachment bolt 154. While only two different types of brake paws 150*a* and 150*b* are illustrated in detail in FIG. 6, it will be understood that a wide variety of different patterns and configurations may be-provided as desired.

On occasion, the sport of sledding involves a sled operator who unintentionally falls from the sled, or perhaps dismounts intentionally to avoid collision with an object. Under such circumstances, a runaway sled can present a significant hazard to others. Accordingly, the present sled 10 includes an emergency or "dead man's" brake 78, which automatically activates to engage the underlying surface when the sled operator leaves the sled 10 for any reason after the operator has armed the emergency brake 78.

Figure 7A:
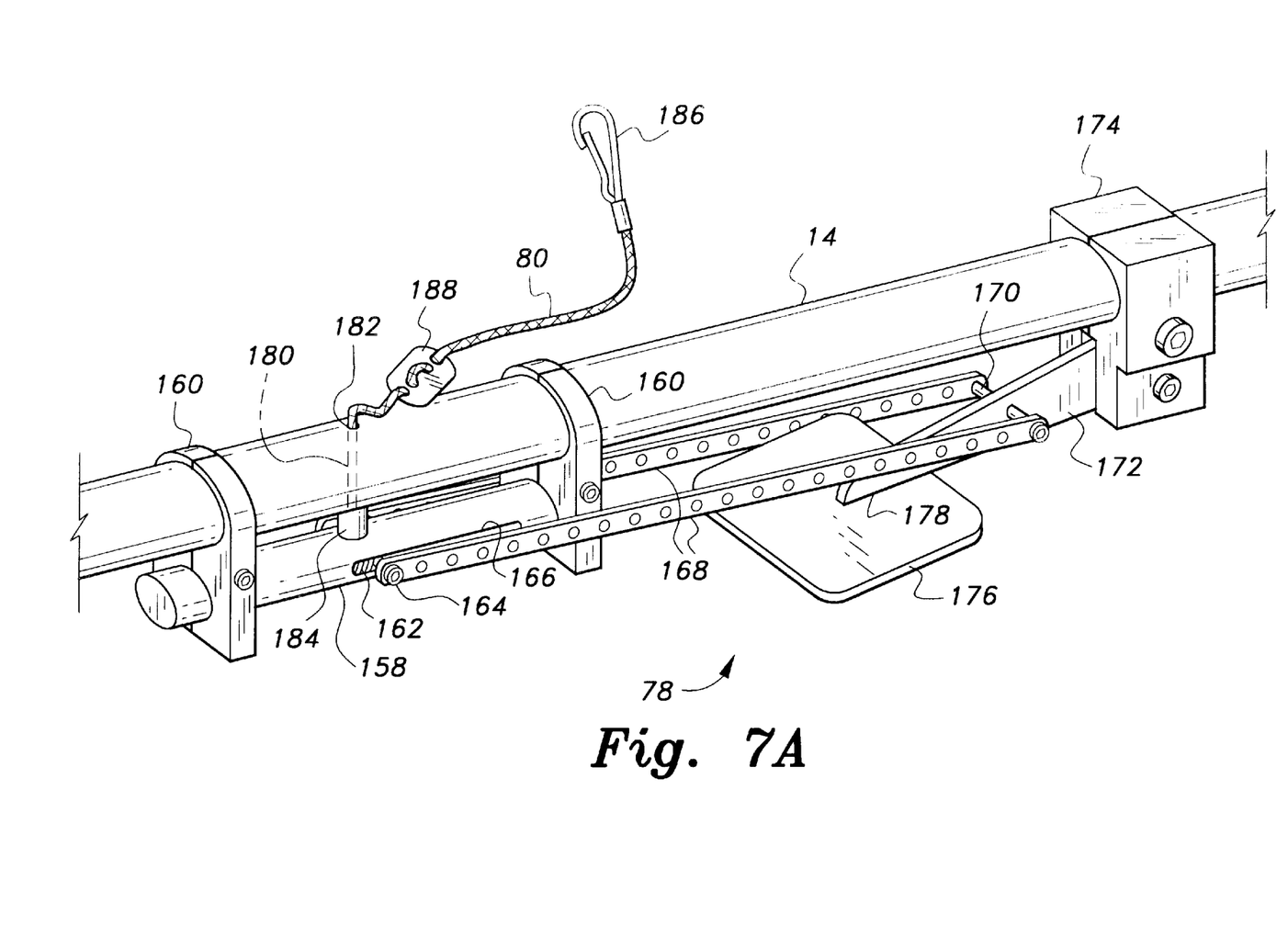
FIGS. 7A and 7B respectively show the emergency or "dead man's" brake apparatus in inactivated and deployed positions, and operating mechanism therefor.
Figure 7B:
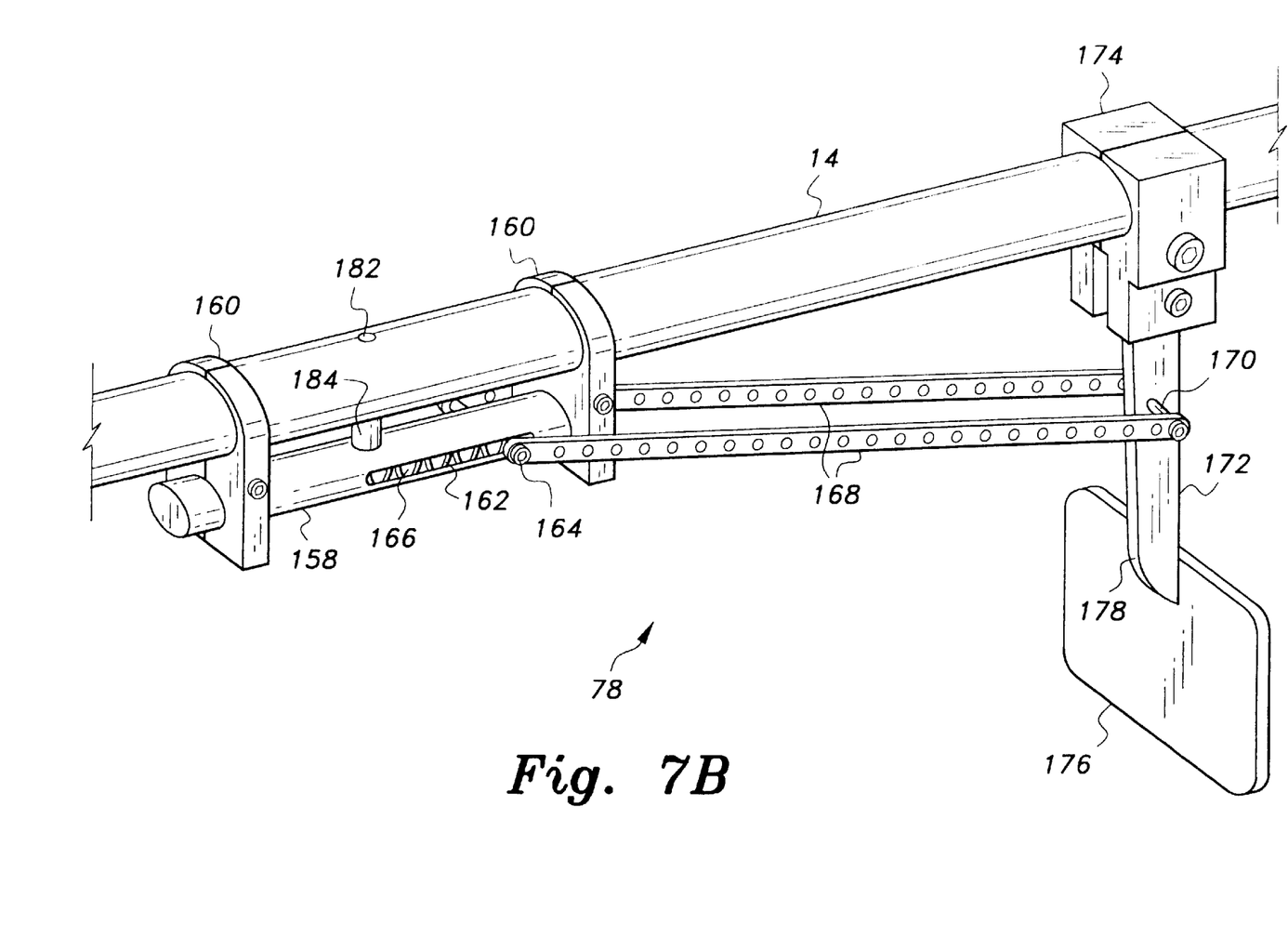

FIGS. 7A and 7B of the drawings respectively provide perspective views of the armed but inactivated brake, and the engaged brake after deployment. The present emergency brake apparatus 78 comprises a brake actuator tube 158, which is secured beneath the central backbone member 14 of the frame 12 by an attachment bracket 160 at each end thereof. Alternatively, conventional through bolts passing through the central frame backbone member 14 and attaching to the brake actuator tube 158, may be used to secure the emergency brake assembly 78 to the sled 10 structure. The brake actuator tube 158 contains a coil brake actuator compression spring 162 therein (more clearly shown in the FIG. 7B view of the deployed brake), which bears against a lateral axle 164 which extends through opposed left and right slots 166 formed in the sides of the actuator tube 158. The axle 164 is in turn connected to the forward ends of opposed left and right brake actuator links 168, which drive a transverse brake arm pin 170 extending from the brake arm 172. The brake arm 172 is pivotally secured to the frame backbone member 14 by a brake arm attachment bracket 174, with an emergency brake shoe 176 extending from the distal end 178 of the brake arm 172 opposite its attachment end with the bracket 174.

The brake actuator spring 162 is held in its normally retracted position by a brake actuating spring release pin 180 which extends through a passage 182 formed through the frame backbone member 14 and a sleeve 184 between the backbone member 14 and the brake actuator tube 158. An adjustable emergency brake actuating line, cable, or lanyard 80 extends from the pin 180, with the line 80 having a clip 186 extending from its distal end for attachment to an article of clothing (jacket, etc.) or other suitable accessory worn or carried directly by the sled operator O.

The sled operator O normally operates the sled 10 with the emergency brake 78 in its retracted position, as shown in FIG. 7A of the drawings. In the event that the operator O dismounts from the sled 10, either intentionally or unintentionally, the emergency brake actuator line or lanyard 80 pulls the spring release pin 180 from its position retaining the brake actuator spring 162 in its compressed state, by means of the apparel attachment clip 186 previously secured to some garment or other suitable attachment point (belt, etc.) of the sled operator O. (A length adjustment clip 188 may be provided along the lanyard 80, if so desired.) When the pin 180 is pulled from its position through the brake actuator tube 158, the emergency brake actuator spring 162 extends, driving the two brake actuator links 168 rearwardly to pivot the brake arm 172 rearwardly and downwardly, thereby deploying the emergency brake shoe 176 to engage the underlying surface, generally-as shown in FIG. 7B of the drawings.

The spring 162 is easily compressed by pivoting the brake arm 172 upwardly, with the spring retaining pin 180 being reinserted in its passage 182 to secure the spring 162 when deployment of the emergency brake assembly 78 is no longer needed. It will be seen that the above described emergency brake assembly 78 can also serve as a parking brake for the present sled 10, when the sled 10 is left unattended upon a sloping surface. The operator O need only pull the pin 180 from the brake assembly 78 to deploy the brake shoe 176, and drive the brake shoe 176 into the underlying surface by placing some weight on the sled 10 momentarily.

Figure 8:
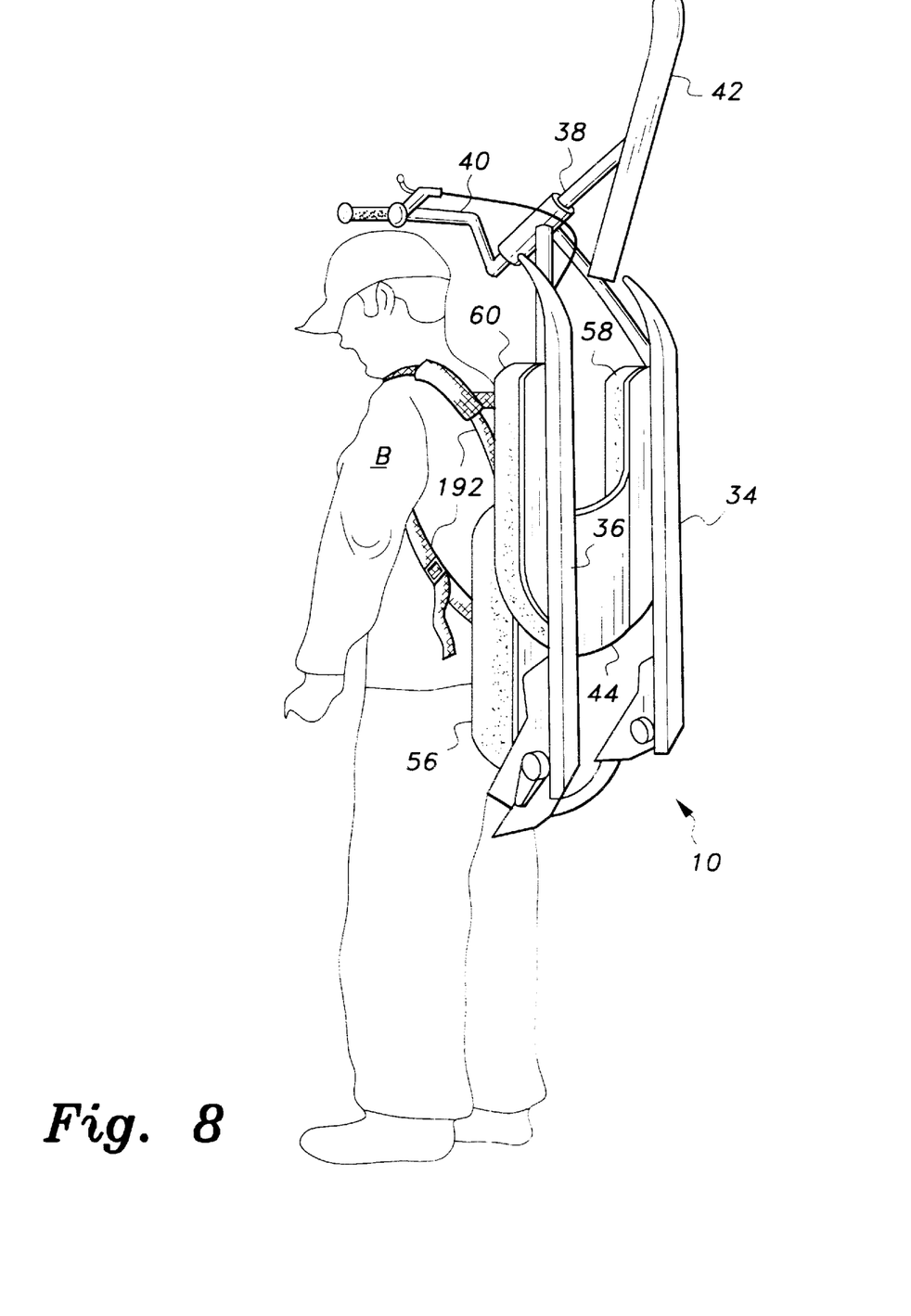
FIG. 8 is a left side and rear perspective view of a person carrying the present three runner sled in its backpacking configuration.

Further versatility for the present three runner sled 10 is provided by means of a series of harness attachment clips 190 extending from the edges of the upper plate 46 of the saddle 44, as shown in FIG. 2 of the drawings. These clips 190 permit the attachment of a harness 192 for backpacking the sled 10, as shown in FIG. 8 of the drawings. Conventional snaps, carabineer, or other suitable attachment means (not shown) may be provided at the strap attachment ends of the harness 192, for removable attachment of the harness 192 to the harness attachment clips 190 of the sled 10. The harness 192 may include conventional adjustment means, padding, and/or transverse auxiliary straps as desired. However, the present sled 10 is very light in weight, due to the light weight metal tubular structure of the main frame 12 and its relatively small and compact size. Thus, only a minimal harness 192 is required for convenient backpacking of the present sled 10.

By placing the backpack harness attachment clips 190 adjacent the seat cushion 56, the cushion is placed against the back of the backpacker B, thereby avoiding discomfort due to hard or sharp components protruding into the backpacker's back. The rearward deployment of the seat support plate 46 of the saddle 44, results in the sled 10 being carried relatively high on the back of the backpacker B with the steering mechanism 40 (handlebars, wheel, yoke, tiller, etc.) remaining clear of the head of the backpacker, in order to provide further comfort and convenience while backpacking the present sled 10.

In conclusion, the present three runner sled provides numerous improvements over other sled type devices used in snow sports and the like. The low seating position provides excellent stability for the present sled, while providing a comfortable seating and operating position as well. Adjustment of the positioning of the various components (cushions, foot rests, etc.) and/or different frame sizes are easily accomplished-to provide comfort for a wide variety of sledders. The steering system is akin to that used in bicycles, thus providing economy of manufacture and natural acclimation to the sled operator. The upward and rearward inclination of the steering column results in the inner edge of the front runner digging into the underlying surface in a turn, thereby providing positive "bite" for turning maneuvers. This, along with the adjustable suspension and spring biased front runner, provide additional positive steering traction for the present sled. The adjustable camber provided for the two directionally fixed runners or skis, also enables the sled operator to provide those runners with good lateral grip to avoid lateral slipping or skidding of the present sled during turning maneuvers.

In addition to the safety improvements provided by the front steering and suspension system, the independently operable brakes of the sled provide further safety benefits. As the brake paws may be interchanged as desired for different conditions, the sled operator may optimize the braking as desired. The use of differential brakes, along with the positive steering provided in the present sled, result in superior maneuverability and safety for the present sled.

In addition to the manually actuated brakes, the emergency or "dead man's" brake of the present sled provides further safety benefits. In the event the operator inadvertently or intentionally dismounts from the sled, the emergency brake automatically deploys in a split second to slow and stop the sled, thereby preventing a runaway sled and the accompanying hazards of such an event. The emergency brake provides further benefits, in that it is easily deployable as a parking brake when desired, and easily retracted for normal operation of the sled as desired. The present three runner sled will thus prove to be a most popular vehicle for any and all persons who enjoy various winter sports.

It is to be understood that the present invention is not limited to the sole embodiment described above, but encompasses any and all embodiments within the scope of the following claims.

I claim:

1. A three runner sled, comprising:
   a peripheral frame having a raised, longitudinal backbone member with a forward end, a rearward end, and generally laterally depending forward and rearward, left and right side braces with corresponding left and right side longitudinal members extending respectively therebetween;
   a single, steerable front runner extending from said forward end of said frame;
   generally rearwardly disposed, laterally separated left and right, directionally fixed rear runners secured respectively to said left and right side longitudinal members of said frame;
   a seat disposed rearwardly upon said backbone member of said frame;
   a knee rest disposed atop each of said longitudinal members, slightly forwardly of said seat;
   a foot rest disposed rearwardly atop each of said longitudinal members and behind each respective said knee rest, for providing a generally kneeling position for a sled operator;
   a separate, selectively and independently actuated, rearwardly disposed left and right brake extending rearwardly respectively from each of said longitudinal members;
   a brake shoe removably installed upon each said brake; and
   at least one separate, selectively replaceable and interchangeable second brake shoe for each said brake.

2. The three runner sled according to claim 1, further including:
   a tubular steering column passage extending from said forward end of said frame;
   a rotatable steering column disposed concentrically through said steering column passage;
   said steering column having an upper tube with operator controlled steering extending therefrom, and a lower tube with said front runner extending therefrom; and
   a front suspension resiliently securing said lower tube of said steering column within said upper tube of said steering column.

3. The three runner sled according to claim 2, wherein said front suspension is selectively adjustable.

4. The three runner sled according to claim 1, further including an automatically actuated emergency brake for automatically operating in the event of sled operator dismount.

5. The three runner sled according to claim 1, further including backpacking attachments therefor.

6. A three runner sled, comprising:
   a peripheral frame having at least a forward end and a rearward end;
   a tubular steering column passage extending from said forward end of said frame;
   a rotatable steering column disposed concentrically through said steering column passage;
   said steering column having an upper tube with operator controlled steering extending therefrom, and a lower tube having a single, steerable front runner extending therefrom;
   generally rearwardly disposed, laterally separated left and right, directionally fixed rear runners secured respectively to said frame; and
   a selectively adjustable front suspension resiliently and telescopically disposing said lower tube of said steering column concentrically within said upper tube of said steering column, wherein said selectively adjustable front suspension comprises:
   said lower tube having a fixed lower spring stop and an open upper end;
   said upper tube having an open lower end and an upper end;
   an adjustably positionable upper spring stop disposed within said upper end of said upper tube; and
   a compression spring captured between said lower spring stop of said lower tube and said adjustably positionable upper spring stop of said upper end of said upper tube;
   said adjustably positionable upper spring stop including:
      a cylindrical spring stop assembly having an upper portion and a lower portion;
      said upper portion having an unthreaded bolt passage formed concentrically therethrough, and a sloped, truncated lower portion contact face;
      said lower portion having a threaded bolt passage formed concentrically therethrough, and a sloped, truncated upper portion contact face; and a lock bolt disposed through said upper portion and engaging said lower portion for selectively tightening said upper portion and said lower portion together positionally as desired, whereby said upper portion and said lower portion are shifted radially relative to one another, wedging tightly within said upper tube.

7. The three runner sled according to claim 6, wherein:

said frame further includes a raised, longitudinal backbone member with a forward end, a rearward end, and generally laterally depending forward and rearward left and right side braces with corresponding left and right side longitudinal members extending respectively therebetween;

generally rearwardly disposed, laterally separated left and right, directionally fixed rear runners affixed respectively to said left and right side longitudinal members of said frame;

a seat disposed rearwardly upon said backbone member of said frame;

a knee rest disposed atop each of said longitudinal members, slightly forwardly of said seat; and a foot rest disposed rearwardly atop each of said longitudinal members and behind each respective said knee rest, for providing a generally kneeling position for a sled operator.

8. The three runner sled according to claim 7, further including:

a separate, selectively and independently actuated, rearwardly disposed left and right brake extending rearwardly respectively from each of said longitudinal members;

a brake shoe removably installed upon each said brake; and at least one separate, selectively replaceable and interchangeable second brake shoe for each said brake.

9. The three runner sled according to claim 6, further including an automatically actuated emergency brake for automatically operating in the event of sled operator dismount.

10. The three runner sled according to claim 6, further including backpacking attachments therefor.

11. A three runner sled, comprising:

a peripheral frame having at least a raised, longitudinal backbone member with a forward end and a rearward end;

a single, steerable front runner extending from said forward end of said frame;

generally rearwardly disposed, laterally separated left and right, directionally fixed rear runners extending from said frame; and an automatically actuated emergency brake for automatically operating in the event of sled operator dismount, said emergency brake including:

an emergency brake arm pivotally deployed from said longitudinal backbone member of said frame;

said emergency brake arm further including a distal end with an emergency brake shoe extending therefrom;

a normally compressed emergency brake actuating spring;

at least one emergency brake actuating link extending between said emergency brake actuating spring and said emergency brake arm;

an emergency brake actuating spring release pin, normally disposed across said emergency brake actuating spring; and an emergency brake actuating line extending from said emergency brake actuating spring release pin to the sled operator, whereby dismount of the sled operator pulls said emergency brake actuating spring release pin from said emergency brake actuating spring by means of said emergency brake actuating line to drive said emergency brake handle to a deployed position by means of the release of said emergency brake actuating spring.

12. The three runner sled according to claim 11, wherein:

said frame further includes generally laterally depending forward and rearward left and right side braces with corresponding left and right side longitudinal members extending respectively therebetween;

said rear runners being adjustably secured respectively to said left and right side longitudinal members of said frame;

a seat disposed rearwardly upon said backbone member of said frame;

a knee rest disposed atop each of said longitudinal members, slightly forwardly of said seat; and a foot rest disposed rearwardly atop each of said longitudinal members and behind each respective said knee rest, for providing a generally kneeling position for a sled operator.

13. The three runner sled according to claim 12, further including:

a separate, selectively and independently actuated, rearwardly disposed left and right brake extending rearwardly respectively from each of said longitudinal members;

a brake shoe removably installed upon each said brake; and at least one separate, selectively replaceable and interchangeable second brake shoe for each said brake.

14. The three runner sled according to claim 11, further including:

a tubular steering column passage extending from said forward end of said frame;

a rotatable steering column disposed concentrically through said steering column passage;

said steering column having an upper tube with operator controlled steering extending therefrom, and a lower tube with said front runner extending therefrom; and a front suspension resiliently securing said lower tube of said steering column within said upper tube of said steering column.

15. The three runner sled according to claim 14, wherein said front suspension is selectively adjustable.

16. The three runner sled according to claim 11, further including backpacking attachments therefor.

* * * * *